(12) United States Patent
Han et al.

(10) Patent No.: US 11,231,570 B2
(45) Date of Patent: Jan. 25, 2022

(54) HIGHLY INCLINED SWEPT TILE (HIST) IMAGING APPARATUS, METHODS, AND APPLICATIONS

(71) Applicant: University of Central Florida Research Foundation, Inc., Orlando, FL (US)

(72) Inventors: Kyu Young Han, Orlando, FL (US); Jialei Tang, Oviedo, FL (US)

(73) Assignee: UNIVERSITY OF CENTRAL FLORIDA RESEARCH FOUNDATION, INC., Orlando, FL (US)

( * ) Notice: Subject to any disclaimer, the term of this patent is extended or adjusted under 35 U.S.C. 154(b) by 141 days.

(21) Appl. No.: 16/398,463

(22) Filed: Apr. 30, 2019

(65) Prior Publication Data
US 2019/0331904 A1    Oct. 31, 2019

Related U.S. Application Data

(60) Provisional application No. 62/769,976, filed on Nov. 20, 2018, provisional application No. 62/664,680, filed on Apr. 30, 2018.

(51) Int. Cl.
*G02B 21/00* (2006.01)
*G02B 21/36* (2006.01)
(Continued)

(52) U.S. Cl.
CPC ..... *G02B 21/0076* (2013.01); *G01N 21/6458* (2013.01); *G02B 21/008* (2013.01);
(Continued)

(58) Field of Classification Search
CPC ............. G02B 21/008; G02B 21/0076; G02B 21/0032; G02B 21/02; G02B 21/06;
(Continued)

(56) References Cited

U.S. PATENT DOCUMENTS

2016/0305883 A1* 10/2016 Betzig .................... G02B 21/06
2016/0327779 A1* 11/2016 Hillman ................. G02B 23/04

FOREIGN PATENT DOCUMENTS

JP         2005003909 A      1/2005

OTHER PUBLICATIONS

M. Tokunaga, N. Imamoto, and K. Sakata-Sogawa, "Highly inclined thin illumination enables clear single-molecule imaging in cells," Nat. Methods 5, 159-161 (2008).
(Continued)

*Primary Examiner* — Mustak Choudhury
(74) *Attorney, Agent, or Firm* — Klintworth & Rozenblat IP LLP; William Greener

(57) ABSTRACT

A fluorescent emission HIST microscope utilizes a highly inclined tile beam that is scanned over a biological sample object. Fluorescence emission from the sample is propagated through a confocal slit into an sCMOS camera supporting a rolling shutter mode. The tile beam is synchronously swept with the readout of the camera to facilitate the rejection of background. The system provides for decoupling of the total imaging area from the beam thickness, which now solely depends on the width of the tile beam, enabling a thinner illumination and larger FOV imaging. Clear visualization of single molecules across a 130 μm×130 μm FOV provided a greater than 40× FOV than conventional HILO imaging. An associated imaging method is disclosed.

15 Claims, 5 Drawing Sheets

(51) Int. Cl.
 *G02B 21/02* (2006.01)
 *G01N 21/64* (2006.01)
(52) U.S. Cl.
 CPC ..... *G02B 21/0032* (2013.01); *G02B 21/0036* (2013.01); *G02B 21/0048* (2013.01); *G02B 21/02* (2013.01); *G02B 21/36* (2013.01)
(58) Field of Classification Search
 CPC ...... G02B 21/36; G02B 21/367; G01N 21/17; G01N 21/64; G01N 21/6458
 See application file for complete search history.

(56) References Cited

OTHER PUBLICATIONS

C. A. Konopka and S. Y. Bednarek, "Variable-angle epifluorescence microscopy: a new way to look at protein dynamics in the plant cell cortex," Plant J. 53, 186-196 (2008).

\* cited by examiner

Fig. 5a
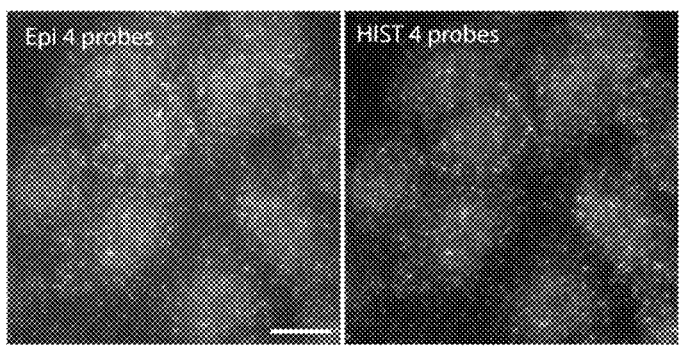
Fig. 5b
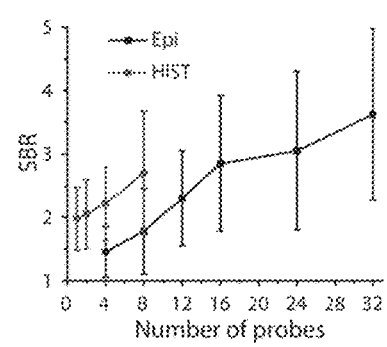
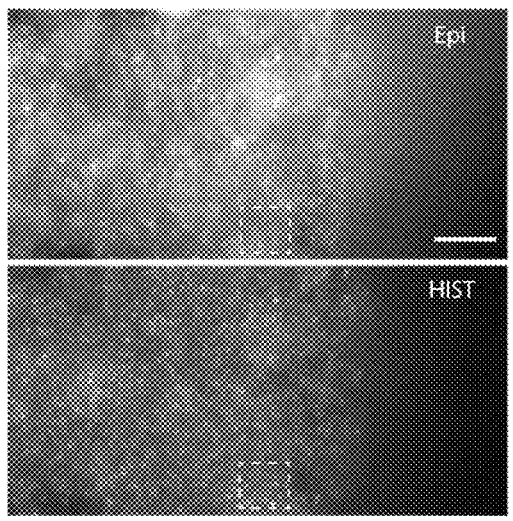
Fig. 5c
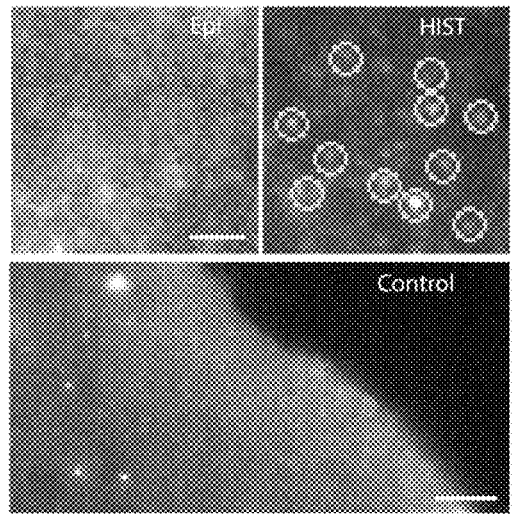
Fig. 5d
Fig. 5e
FIG. 5

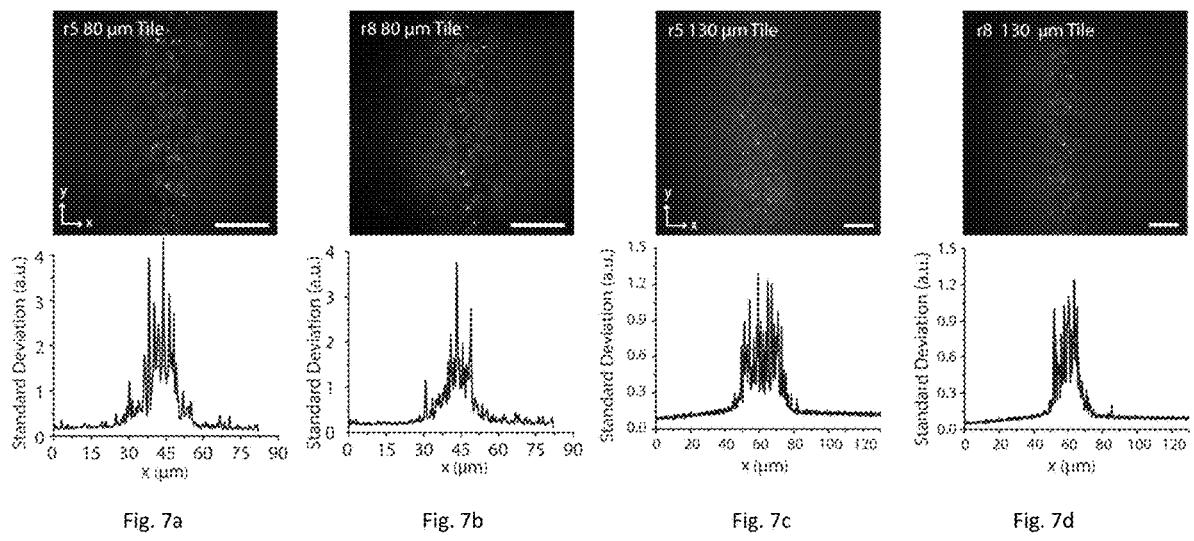
Fig. 7a  Fig. 7b  Fig. 7c  Fig. 7d
FIG. 7
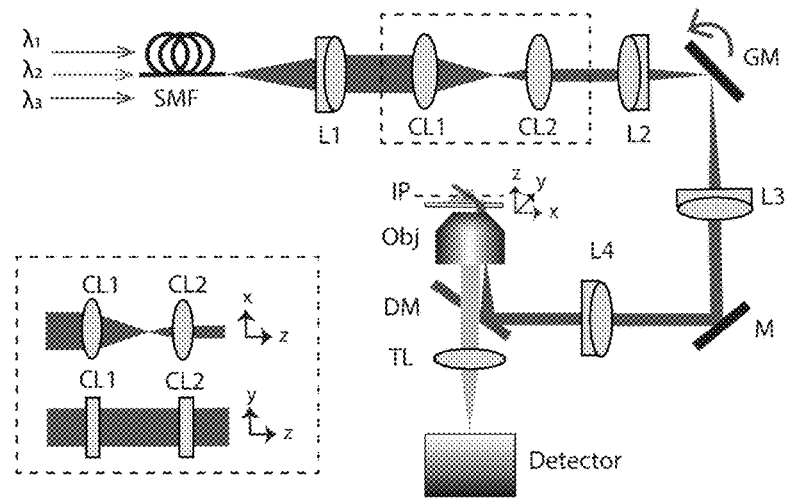
FIG. 8

HIGHLY INCLINED SWEPT TILE (HIST) IMAGING APPARATUS, METHODS, AND APPLICATIONS

RELATED APPLICATION DATA

The instant application claims priority to U.S. provisional application Ser. No. 62/664,680 filed Apr. 30, 2018 and U.S. provisional application Ser. No. 62/769,976 filed Nov. 20, 2018, the subject matters of which are incorporated by reference herein in their entireties.

GOVERNMENT FUNDING

Funding for the invention was provided by Defense Advanced Research projects Agency (DARPA) under contract No. HR00111720066 and National Science Foundation (NSF) under contract No. 1805200. The U.S. government has certain rights in the invention.

BACKGROUND

Non-limiting aspects and embodiments of the invention most generally pertain to the field of microscopy; more particularly to single molecule and depth-resolved biological tissue imaging. Most particularly, non-limiting aspects and embodiments are directed to Highly Inclined Swept Tile (HIST) fluorescence microscopy apparatus, methods, and applications thereof.

Single-molecule fluorescence imaging plays an important role in many biological studies that reveal ultrastructures, dynamics, and the quantity of biomolecules; however, it has been challenging to study single-molecules inside cells or tissues. While confocal microscopy provides high sectioning capability, it is not suitable for single-molecule imaging due to severe photobleaching by the high excitation intensity or slow imaging speed. Widefield microscopy uses weaker illumination but suffers from a poor signal to background ratio (SBR). Light-sheet microscopy, on the other hand, provides good sectioning and low photobleaching; however, the available numerical aperture (NA) is greatly limited by the requirement of orthogonally placed objectives. This technique also requires special illuminators and sample chambers.

For these reasons, highly inclined and laminated optical sheet (HILO) microscopy has been widely used for 3D single-molecule imaging. When an inclined beam encounters an interface of two media (glass and water, for example), the beam is refracted according to Snell's law. Importantly, the refracted beam gets thinner, and its thickness is described as $dz=R/\tan(\theta)$, where R is the diameter of the inclined beam and $\theta$ is the refraction angle of the transmitted beam. This simple implementation results in a good sectioning capability. Nevertheless, this relation indicates that a thin illumination (i.e., high sectioning capability) requires a small R and/or a large $\theta$; e.g., when R=20 µm and $\theta$=72 degrees one can obtain dz=6.5 µm. Since there is a practical limit to increasing the refraction angle in order to image deep inside cells and avoid total internal reflection, there is a strong coupling of the illumination diameter and the beam thickness. For this reason, HILO imaging shows a relatively small field-of-view (FOV) that greatly restricts its applications in multicellular imaging and tissue imaging.

The inventors have recognized the advantages and benefits of fluorescence microscopy apparatus and methods that overcome the known disadvantages of conventional confocal fluorescence microscopy, widefield microscopy, and HILO microscopy apparatus and techniques and further which provide improvements in speed, optical sectioning, and other desirable attributes appreciated by those skilled in the art. Such fluorescence microscopy apparatus and methods are described and claimed herein below.

SUMMARY

Detailed information relating to aspects and embodiments described herein may be found in Tang et al., *A guide to build a highly inclined swept tile microscope for extended field-of-view single-molecule* imaging, J. Vis. Exp. (146), e59360 (April 2019) and Tang, J., & Han, K. Y., *Extended field-of-view single-molecule imaging by highly inclined swept illumination*, Optica. 5, 1063-1069 (2018), the subject matter of both of which are incorporated by reference to the fullest extend allowed by applicable laws and rules.

As used herein the term 'highly inclined' has the meaning that a PHOSITA would understand. More particularly, with reference to a Cartesian (x, y, z) coordinate system, where ±z is the direction of propagation of an optical beam, 'highly inclined' means in the range between 60-70 degrees±<10 degrees about the positive y axis in the x-z plane.

The term 'tile' is used herein to represent an elongate, line-shaped beam having a finite length, $L_y$ (e.g., 80-130 µm) along the y-axis, a thickness, dz (e.g., 3-5 µm) along the z-axis, and most significantly a width dimension, $w_x$, along the x-axis of between about 10-14 µm (See FIG. 1b). As such, rather than having a 'narrow' beam width of equal to or less than a few microns, the line-shaped beam of said greater width is referred to as a 'tile.'

An embodiment of the invention is a highly inclined swept tile (HIST) microscope. The HIST microscope includes an optical train having a Cartesian z-direction optical axis, said and includes a first optical component/assembly disposable to receive a sample object fluorescence excitation input light, wherein the first optical assembly has optical characteristics suitable to transform the input light into a collimated output tile beam in the shape of a line oriented in an x-y plane and characterized by a length, $L_y$, along the y-axis, a width, $w_x$, along the x-axis, and a thickness, dz, along the z-axis, further wherein $L_y \gg w_x \gg dz$; a second optical component/assembly disposable to receive the collimated tile-beam and having optical characteristics suitable to orient the tile beam at a highly inclined angle, $\theta$, about the y-axis in the x-z plane; a third optical component/assembly having optical characteristics suitable to focus the highly inclined tile beam at an image plane; a fourth optical component/assembly disposed in a conjugate back focal plane of the image plane having optical characteristics suitable to sweep the highly inclined tile beam along a horizontal x-axis in the image plane; and a detector/camera assembly disposable in a conjugate image plane including either a confocal slit or a functionally equivalent electrooptical confocal slit to receive a fluorescence emission from the sample object, wherein said HIST microscope is to be configured as a confocal, fluorescence emission microscope, further wherein the tile beam thickness, dz, and the tile beam length, $L_y$, are decoupled, further wherein the HIST microscope has a total imaging area that depends solely on the tile beam width, $w_x$. In various non-limiting, exemplary embodiments and aspects the HIST microscope may have one or more of the following features, characteristics, limitations, or functions alone or in various combinations:

wherein the first optical component/assembly is a pair of cylindrical lenses;

wherein the second optical component/assembly is a tiltable mirror;

wherein the third optical component/assembly is an objective;

wherein the fourth optical component/assembly is a galvo mirror;

wherein the detector/camera assembly is a scientific complementary metal-oxide semiconductor (sCMOS) supporting a rolling shutter mode;

wherein 80 µm≤$L_y$≤130 µm, 8 µm≤$w_x$≤14 µm, 3.0 µm≤dz≤4.0 µm and is characterized by a field of view (FOV) up to 130 µm×130 µm.

An embodiment of the invention is a method for imaging a sample object. The method includes the steps of generating a collimated tile beam having a wavelength suitable for generating a fluorescent emission from a region of the sample object, wherein the tile beam has a line shape of length, $L_y$, thickness, dz, and width, $w_x$, wherein $L_y$ and $w_x$ are measured in an x-y Cartesian plane and dz is measured in an orthogonal z-axis beam propagation direction, further wherein $L_y$>>$w_x$>>dz; disposing the tile beam at a highly inclined angle, θ, in the x-z Cartesian plane; sweeping the highly inclined tile beam along the x-axis across a region of the sample object and generating a fluorescent emission from the sample object; propagating the fluorescent emission from the sample object to a detector comprising a confocal slit, wherein the tile beam is synchronously swept with an output of the detector. In various non-limiting, exemplary embodiments and aspects the method may include one or more of the following steps, features, characteristics, limitations, or functions alone or in various combinations:

further comprising generating the collimated tile beam having the length, $L_y$, between 80-130 µm, the width, $w_x$, between 8-14 µm, and the thickness dz between 3.0-4.0 µm;

further comprising using two cylindrical lenses to generate the collimated tile beam;

further comprising using a galvo-mirror to sweep the collimated tile beam;

further comprising using a moveable mirror conjugated to the imaging plane to incline the collimated tile beam;

further comprising using a scientific complementary metal-oxide semiconductor (sCMOS) camera supporting a rolling shutter mode to synchronously sweep the collimated tile beam with the readout of the camera;

further comprising compressing the collimated tile beam by a factor, r, equal to 4×-8× that of a corresponding HILO beam;

further comprising disposing the tile beam at the highly inclined angle, θ equal to 60-80 degrees.

BRIEF DESCRIPTION OF THE DRAWINGS

FIG. 5 shows single-molecule RNA FISH imaging on mammalian cells with different numbers of probes; (a) smFISH images of EEF2 on A549 cells with epi and HIST illumination with four probes. A maximum intensity projection was performed on 20 z stacks (5 µm thickness). The illumination power was 40 W/cm$^2$ and the integration time was 400 ms. DAPI stain is in blue; (b) Signal to background ratio for different numbers of FISH probes with epi and HIST illumination. More than 100 single-molecule spots were analyzed and the error bars denote standard deviation from the mean; (c) Single-molecule RNA FISH imaging on mouse brain tissues with 5 probes, specifically, smFISH images of EEF2 with 5 FISH probes by epi and HIST illumination. The integration time was 800 ms. Z-stack images were obtained from z=4 µm to z=7 µm and maximum projected (at coverslip, z=0 µm); (d) Magnified images of the boxed region in (c). White circles indicate identified mRNA spots; (e) Control experiment of mouse brain smFISH imaging with 0.5% RNase treatment. All FISH probes were labeled with AF647. Scale bars, 20 µm (a), 10 µm (c,e), 2 µm (d), according to illustrative aspects.

FIG. 7 shows effective beam widths of tile illumination. (top) Fluorescence images of 20 nm beads in 3D hydrogel using a compression ratio of 5 and 8 with a tile length of 80 µm or 130 µm, respectively. Scale bar, 20 µm. (bottom) Standard deviation projection along y-direction for each image. The illumination widths of r=5 and r=8 for ~80 µm tile are ~10 µm and ~1 µm, and those of r=5 and r=8 for ~130 µm tile are ~14 µm and ~24 µm, according to illustrative aspects.

FIG. 8 shows an optical schematic of a Highly Inclined Swept Tile (HIST) microscope system. λ1=405 nm, λ2=561 nm, λ3=638 nm; CL1-2 are cylindrical lenses; DM is a dichroic mirror; GM is a galvo mirror; IP is the imaging plane; L1-4 are relay lenses; M is a mirror; SMF is a single mode fiber; TL is a tube lens, according to illustrative aspects.

DETAILED DESCRIPTION OF NON-LIMITING, EXEMPLARY EMBODIMENTS

Figure 1A:
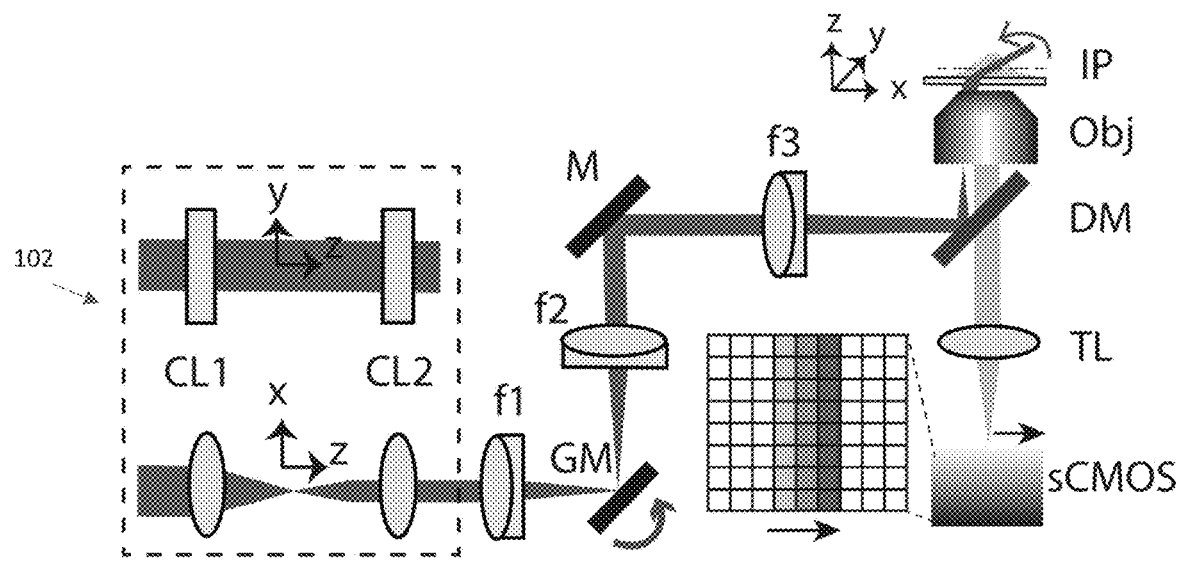
FIG. 1: a) schematically shows a HIST microscope set-up according to a non-limiting embodiment; b) shows the geometry and orientation of the highly inclined HIST beam, according to an illustrative aspect.

Disclosed embodiments are described with reference to the attached figures, wherein like reference numerals are used throughout the figures to designate similar or equivalent elements. The figures are not drawn to scale and they are provided merely to illustrate aspects disclosed herein. Several disclosed aspects are described below with reference to example applications for illustration. It should be understood that numerous specific details, relationships and methods are set forth to provide a more complete understanding of the embodiments disclosed herein.

Single-molecule imaging is recognized to be an indispensable tool in many biological studies; i.e., for revealing dynamics of biomolecules, ultra-structures of sub-cellular components, and spatial context of gene expression levels. To visualize individual fluorescent molecules a high signal to noise ratio is advantageous. Although a fluorescent signal can be amplified by multiple tagging systems, the large size of a tagged system can potentially interfere with the activity of the target. Therefore, it is desirable to decrease the background level by minimizing the unwanted out-of-focus fluorescent signal generated by the excitation beam in microscope systems.

As noted above, for known HILO illumination the beam thickness dz is coupled to the diameter, R, of the illumination beam; i.e., $dz=R/\tan(\theta)$, where $\theta$ is the angle of the transmitted beam. This means that a thin illumination width results in a small imaging area. For this reason, a known HILO illumination study was only able to demonstrate a<20×20 µm² FOV with approximately a 6 µm to 7 µm beam thickness, which makes known HILO illumination unsuited for imaging a large mammalian cell or multiple cells with high contrast.

The embodied HIST microscopes and associated methods mitigate or overcome the known HILO microscopy limitations by sweeping a highly inclined 'tile' beam across a sample object in conjunction with a 2D array detector having an electronically synchronized confocal slit, while maintaining the advantages of HILO imaging.

FIG. 1a is a schematic of an example HIST microscope optical set-up 100. In operation a tile beam sweeps (in x-direction) across the FOV by a beam scanning device shown as a galvo mirror GM and the emitted fluorescence is detected by a sCMOS camera 120 with confocal slit detection. CL1 and CL2 are cylindrical lenses; DM is a dichroic mirror; M is a tiltable mirror used to 'highly incline' the beam; Obj is an objective; IP is the imaging plane; TL is a tube lens.

Figure 2:
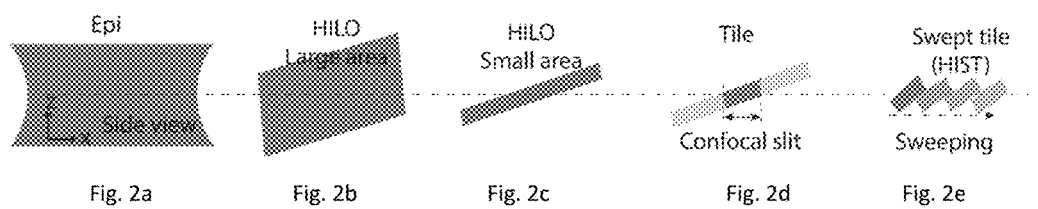
FIGS. 2(a-e) schematically show cross sectional side views of a known epi-illumination beam, a known large-area HILO illumination beam, a known small-area HILO illumination beam, and a tile/confocal slit and a HIST illumination beam, respectively, according to illustrative aspects.

FIGS. 2(a-e) show illumination schemes (side cross-section) known and embodied excitation illumination profiles.

Figure 3:
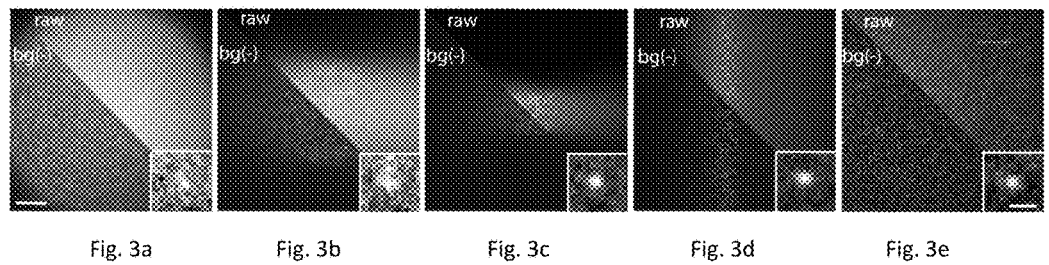
FIGS. 3(a-e) show single-molecule fluorescence images of Atto647N labeled DNA embedded in a hydrogel (bottom, xy cross-section) by (a) epi, (b) large area HILO, (c) small area HILO, (d) tile, and (e) HIST illumination at excitation wavelength of 638 nm. The images were taken 5 µm above the sample surface at a camera frame rate of 800 ms$^{-1}$. The average illumination intensity was 30 W/cm$^2$. Inset, zoom-in single-molecule images. All images are raw data. Scale bar, 20 µm and 5 µm (inset), according to illustrative aspects.

FIGS. 3(a-e) show single-molecule fluorescence images of a sample object comprising Atto647N labeled DNA embedded in a hydrogel (cross-section) by epi in 3a, large area HILO in 2b, small area 20×20 µm² HILO in 3c, a disclosed tile-like beam in 3d, and HIST illumination in 3e at an excitation wavelength of 638 nm. The images were taken 5 µm above the sample surface at a camera frame rate of 800 ms$^{-1}$. The average illumination intensity was 30 W/cm². Insets are zoom-in single-molecule images. The scale bar is 20 µm and 1 µm (inset).

Figure 4:
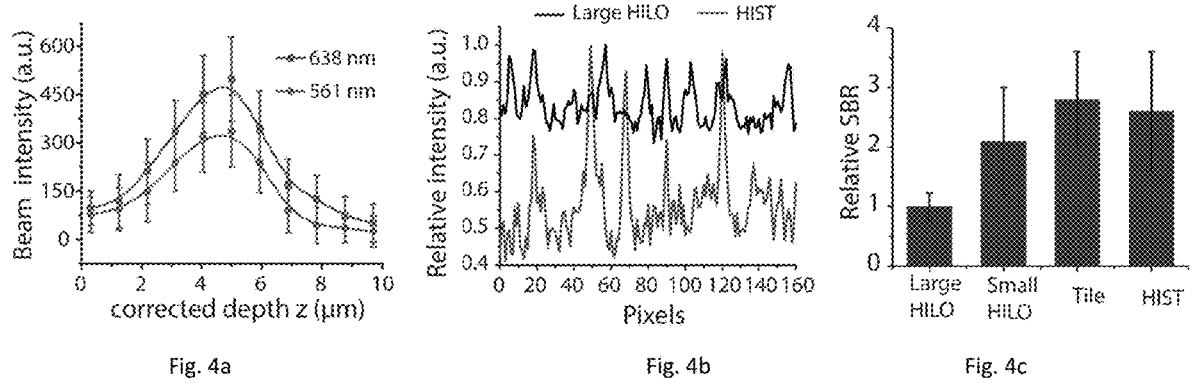
FIG. 4a graphically shows beam thickness of a highly inclined illumination beam (tile) with 638 and 561 nm excitation lights when 8× compression ratio used. The beam thickness was 3.7±0.3 and 3.6±0.2 µm, respectively.
FIG. 4b shows line profiles of large-area HILO and HIST illumination taken from FIGS. 3b and 3e along white dashed lines.
FIG. 4c shows relative signal-background ratio (SBR) for each illumination method. More than 100 single-molecule spots were used for analysis.

FIG. 4a graphically shows beam thickness of a highly inclined illumination beam (tile) with 638 and 561 nm excitation lights when 8× compression ratio used. The beam thickness dz was 3.7±0.3 and 3.6±0.2 µm, respectively. FIG. 4b shows line profiles of large-area HILO and HIST illumination taken from FIGS. 3b and 3e along white dashed lines; FIG. 4c shows relative signal-background ratio (SBR) for each illumination method. More than 100 single-molecule spots were used for analysis.

Figure 1B:
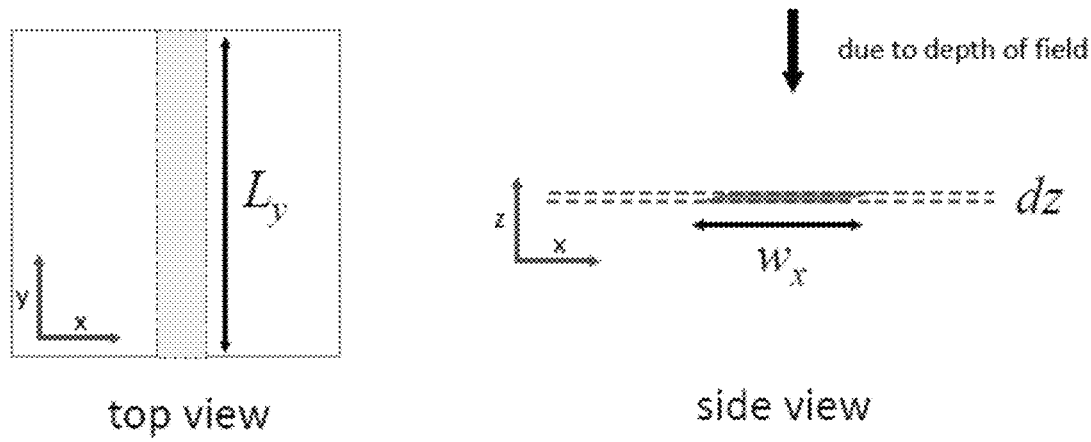

Referring to FIG. 1, an elongated, vertically oriented tile beam was created using the pair of cylindrical lenses 102 and propagated to the conjugated image plane at M where it was highly inclined to a 60-80 degree angle, $\theta$, in the x-z plane by mirror M, then further propagated to the sample object. For imaging, a 3D single-molecule hydrogel sample was prepared with each DNA probe labeled with Atto647N and anchored to the hydrogel network via an acrydite moiety during gel polymerization. Fluorescence images of the sample object are shown in FIGS. 3(a-e), which were imaged at 5 µm above the surface (see FIGS. 3a-e).

While in conventional HILO microscopy an iris is typically used to control the size of the illumination beam in both the x and y directions, the disclosed HIST imaging approach generates an 80-130 µm long (along y-axis) tile-like beam having a non-limiting advantageous width between 10-14 µm in the (x-y) sample plane, which is orthogonal to the z-axis direction of illumination. The said dimensioned tile-like illumination/excitation beam increased the FOV from 20×20 µm² (HILO) to ~130×12 µm². Significantly, this enabled visualizing single-molecules with a higher contrast than HILO illumination with R=20 µm because the elongation of the beam along the y-axis is no longer coupled to the beam width. In contrast, single-molecule spots could not generally be detected with epi-illumination (see FIG. 3a) or HILO illumination with a large beam size (see FIG. 3b) due to a strong background, reconfirming that the image contrast of known HILO illumination is highly dependent upon the beam size.

In order to extend the imaging area over known HILO imaging, the tile beam is swept along the x-axis by a beam scanning device such as a rotating galvo mirror GM. A GM may be used as the beam scanning device because of its convenience and low cost; however, there are many beam scanning device usable as alternatives as known by those skilled in the art.

The highly inclined beam, however, generated out-of-focus background and blurred the image. To resolve this issue, a confocal slit detection apparatus and method were used in conjunction with a scientific complementary metal oxide semiconductor (sCMOS) camera supporting a rolling shutter mode. Synchronously sweeping the tile beam with the readout of the camera facilitated the rejection of background in real time without additional optical components. A sCMOS camera may be used as the array detector and tunable confocal slit because of its convenience; however, there are many methods usable as alternatives as a PHOSITA would understand.

Figure 6:
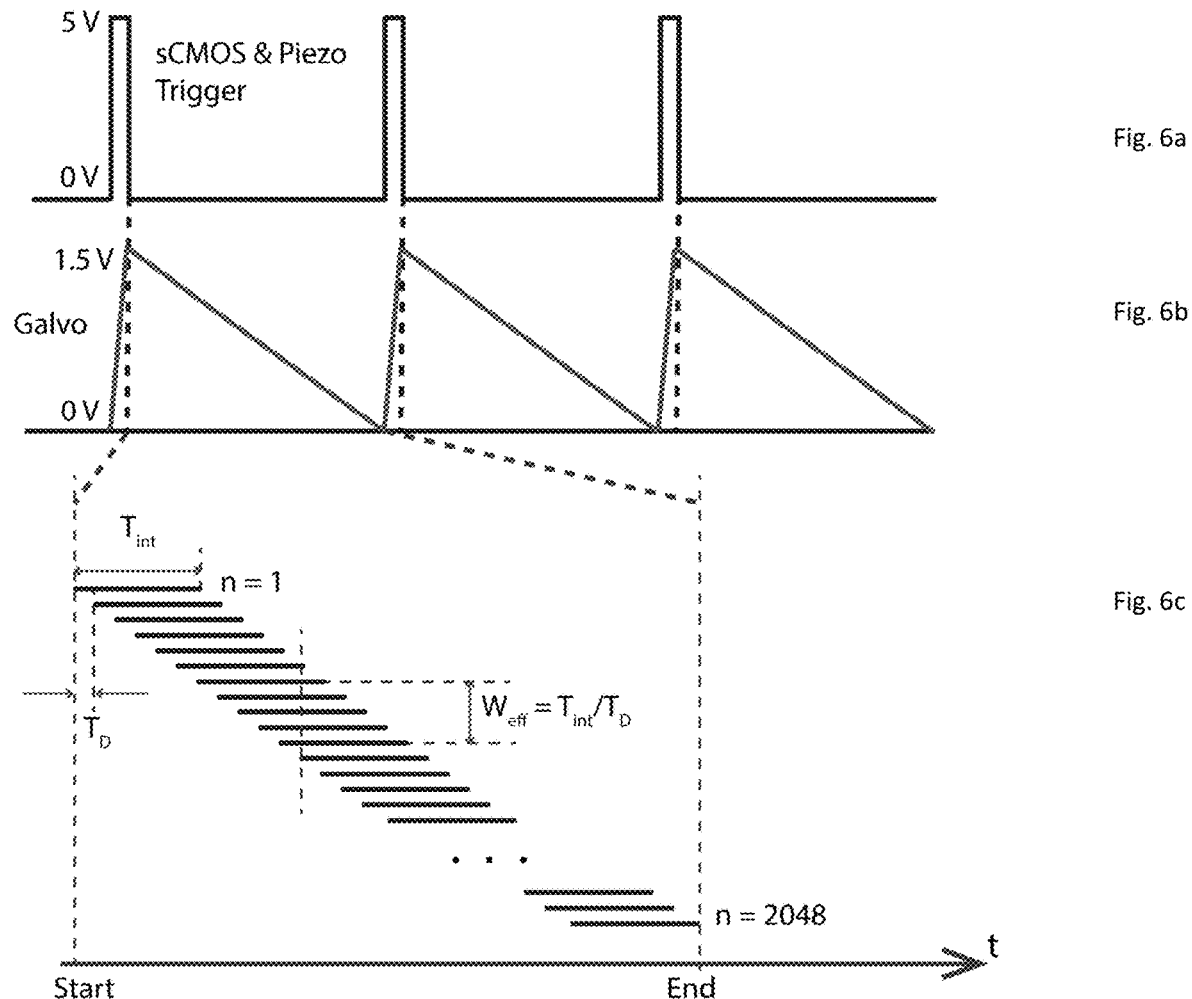
FIG. 6 shows a DAQ timing diagram; (a,b) A trigger signal from a function generator starts the galvo mirror and sCMOS acquisition; (c) Details of light sheet rolling shutter mode control. $T_{int}$ is the integration time of each pixel line, $T_D$ is the delay time of consecutive pixels, $W_{eff}$ is the effective acquisition width; $T_{int}$=60 ms; $T_D$=0.36 ms, and $W_{eff}$=166, according to illustrative aspects.

In conjunction with FIGS. 6a-c, which shows a DAQ timing diagram, a function generator sent a master trigger signal to the camera and piezo stage for synchronizing the image acquisition (FIGS. 6a,b). The sCMOS camera was run in external rolling shutter trigger mode with a line integration time of 60 ms and a delay time of 0.36 ms per line, which corresponds to 800 ms per frame. (FIG. 6c). $T_{int}$ is the integration time of each pixel line, $T_D$ is the delay time of consecutive pixels, $W_{eff}$ is the effective acquisition width. In our experiments, we used $T_{int}$=60 ms, $T_D$=0.36 ms and $W_{eff}$=166.

The size of the total imaging area was decoupled from the beam thickness, which solely depends on the width of the tile, and thus it enabled a thinner illumination and larger FOV imaging. Advantageously, applicants were able to clearly visualize single molecules across ~130 µm×130 µm FOV (FIG. 3e), which was more than 40 times larger than conventional HILO imaging. A line profile clearly showed the much improved signal-to-background ratio (SBR) of HIST microscopy (FIG. 4b) and it was ~2.6 times higher than the large-area HILO counterpart (FIG. 4c).

Applicants further characterized the performance of HIST microscopy using 20 nm fluorescent beads embedded in 3D hydrogel as an imaging sample with 638 nm excitation light. Firstly, Applicants measured the effective illumination width and thickness of the tile beam at a compression ratio (r) of the beam that depends on the pair of cylindrical lenses CL1, CL2 102. For the beam thickness measurement, 200 nm beads embedded in hydrogel were used. Upon a tile beam illumination with 638 nm or 561 nm laser, fluorescence intensities of each bead at different detection planes (z') were measured by moving a detector with a micrometer. We obtained a corrected depth (z) considering a longitudinal translation of the sample plane and that of the detector plane, which are related as $z'/z=(1/n) \times M^2$, where n is the refractive index of the sample and M is the transverse magnification of the system. The intensity at each depth z was averaged from >50 beads, and the full width at half maximum (FWHM) of the intensity profile was used for estimating the beam thickness. For the effective width measurement, we illuminated a tile beam with a compression ratio of 5× or 8× on a 20 nm bead hydrogel sample, and carried out a standard-deviation y-projection that effectively excludes out-of-focus background fluorescence. It results in a line profile along the x axis, and the plateau area of the profile was used as the beam width. The measured width and thickness of the beam were ~10 μm and 3.7±0.3 μm, respectively, at r=8 when an ~80 μm long tile was used. If a lower compression ratio and/or a longer tile is used, the illumination beam becomes proportionally wider and thicker as shown in FIGS. 7a-d. For instance, the SBR at r=8 was 1.4× higher than SBR at r=5. The beam thickness with 561 nm light was 3.6±0.2 μm and a thin illumination was retained over a depth of >10 μm.

Since the tile was swept across a large FOV, the illumination angle (θ) was not constant along the x axis due to a slightly different refraction angle and the aberration. This resulted in an elevated background level on the left side of HIST images (see FIG. 3e). However, after background subtraction, a high contrast HIST image with a uniform background level was readily recovered. A fine adjustment by an additional beam scanning device such as a GM instead of a manual mirror M (FIG. 1) can help to keep the illumination angle constant during tile beam sweeping. However, if an intermediate FOV size is used (e.g., 80 μm×80 μm), single-galvo-mirror sweeping is adequate for a uniform full FOV imaging.

Applicant also measured the photobleaching kinetics by imaging z-stacks of 130 μm×130 μm×5 μm imaging volume in order to check whether an 8× higher instantaneous illumination intensity of HIST imaging may have adverse effects. The fluorescence intensity of the z stack was summed and plotted over time. The decay rate of fluorescence intensity was obtained by a single exponential fit to the time trace. The fluorescence intensity decay rate of HIST imaging was slower than that of epi-illumination at the same average excitation power, presumably because the thin illumination depicted in FIG. 4a decreases the amount of accumulated light dose in the imaging volume.

To demonstrate potential applications of our method, we performed single-molecule RNA fluorescence in situ hybridization (smFISH) with a single probe or a few probes, which is critical for detecting single-nucleotide variants and rare transcriptional mutations. FIG. 5a displays FISH images of EEF2 (eukaryotic translation elongation factor 2) with four probes labeled with AlexaFluor 647 (AF647) on A549 cells. The HIST image showed higher SBR compared to epi and HILO illumination. The photobleaching step distribution revealed the actual number of probes.

Further, we evaluated the SBR of epi and HIST images with different numbers of FISH probes (N=32, 24, 16, 12, 8, 4, 2, 1). When N≤8, the SBR of epi-illumination was not sufficient for robust detection and counting of molecules at our given experimental conditions, i.e., illumination intensity ~40 W/cm² and exposure time 400 ms. Especially for FISH imaging of less than four probes, the autofluorescence background with epi-illumination overwhelmed the fluorescence signal of target mRNAs. In contrast, HIST microscopy showed high SBR (>2) even with a single probe. Images with a single probe upon a maximum intensity projection clearly demonstrated the superior performance of HIST microscopy over epi-illumination. In addition, HIST microscopy has a much more uniform illumination profile compared to epi-illumination, which has been shown in scanned light sheet microscopy.

Applicant imaged EEF2 in a 12 μm thick mouse brain tissue with five FISH probes. A 3 μm thick stack of images was acquired at 5.5 μm in depth. It was generally difficult to distinguish each individual spot with epi-illumination due to high background, while disclosed HIST microscopy allowed Applicants to readily detect mRNA (see FIG. 5c,d), where the SBR was 1.4±0.5. A control experiment with RNase treatment ensured that Applicants' FISH probes bound to the target specifically. It is noted that a standard protocol for smFISH in tissues usually requires at least 48 probes unless the signal is amplified.

The embodied HIST imaging system confers thinner and significantly wider illumination compared to HILO imaging, and can be easily implemented onto a standard inverted microscope. Advantages or benefits of disclosed HIST imaging include a much higher SBR and wider field-of-view compared to known HILO imaging techniques. HIST imaging also features much higher photon collection efficiency compared to oblique illumination imaging. It will be feasible to obtain much thinner and more uniform illumination. Applicants anticipate that HIST microscopy will benefit a variety of imaging applications including super-resolution imaging, single-molecule tracking and smFISH-based high-throughput gene expression profiling. Other expected applications include high-throughput transcriptomics, and super-resolution fluorescence imaging, such as for biomedical applications.

Notwithstanding that the numerical ranges and parameters setting forth the broad scope of the disclosed embodiments are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 5.

Non-Limiting Examples

Experimental HIST microscopy results are reported herein below. All images were acquired by Applicant's custom-made HIST microscope as illustrated in FIG. 8. Three lasers (represented as $\lambda_1$ (405 nm), $\lambda_2$ (561 nm), and $\lambda_3$ (638 nm; Cobolt) were coupled to a single mode fiber (SMF, Thorlabs) and their powers were controlled by a combination of a polarizing beam splitter and a half-wave plate (not shown). The fiber output was collimated by lens L1 (focal length (f)=80 mm) and sent to a telescope comprising two cylindrical lenses (CL1, f=400/250 mm; CL2, f=50 mm) to generate a tile beam compressed 8× or 5×. The beam was relayed by another telescope system (L2, f=60 mm; L3, f=150 mm) with a single-axis GM (GVS211, Thorlabs), passed through a lens L4 (f=400 mm), reflected by a DM (Di03-R405/488/561/635-t3, Semrock) and focused onto the back focal plane (BFP) of an objective, Obj (PlanApo, 60×/1.45, Olympus). The GM conjugated to the back focal plane was used to sweep the highly inclined tile excitation beam on the imaging plane, and was controlled by a function generator (not shown; DG1032Z, Rigol).

The highly inclined beam incidence angle (θ) was adjusted by a tiltable mirror M conjugate to the image plane IP. A 3-axis (x,y,z) piezo stage (MAX311D, Thorlabs) was used for holding samples and acquiring z-stack images, which was controlled by an analog output board (not shown; PCI-6733, National Instruments).

Fluorescence emission from the sample was collected by the same objective and passed through a filter (FF01-446/523/600/677, Semrock). The fluorescence emission light was then focused on an sCMOS camera (ORCA-Flash4.0 LT, C11440-22C, Hamamatsu or Zyla 4.2 PLUS, Andor) by a tube lens TL (f=300 mm). Optionally, a 1:1 4f relay system (f=100 mm) with a slit at the conjugated IP can be installed to reject additional scattered light. The function generator sent a master trigger signal to the camera and the piezo stage for synchronizing the image acquisition (see FIG. 6). The sCMOS camera was run in external rolling shutter trigger mode with a line integration time of 60 ms and a delay time of 0.36 ms per line, which corresponds to 800 ms per frame.

A hydrogel solution was prepared using 7.5% acrylamide: bisacrylamide (29:1) (National Diagnostics), 0.2% (v/v) TEMED and 0.02% (w/v) ammonium persulfate in 0.75× TAE buffer. An 18-nt single-stranded DNA with an acrydite moiety at 5' and Atto647N at 3' (called probe 1) was added to the hydrogel solution at a final concentration of 4 nM. 50 μL of this mixture was dropped on a clean coverslip, sandwiched with another coverslip, and incubated for 1 hour at room temperature in dark. After gently separating them, a thin hydrogel layer about 40 μm thick was washed with and incubated in TAE buffer for 1 hour to remove unbound DNAs. Applicant used an imaging buffer consisted of 1× TAE, 0.8% (w/v) dextrose, 1mg/mL glucose oxidase, 0.04 mg/mL catalase and 2 mM Trolox during all experiments. All chemicals and DNA were purchased from Sigma-Aldrich and IDT unless specified.

All images were 2×2 binned and the pixel size was 130 nm. When obtaining background subtracted images, a local minimum value in a sub-region (16×16 pixels) was calculated and smoothed to obtain a background image which was subtracted from the raw image with an offset to avoid a negative value. For the calculation of signal-to background ratio (SBR), the fluorescence images with different illumination methods were acquired at an imaging depth of ~5 μm. The fluorescence intensity of each isolated imaging spot (IS) was summed in a 7×7 pixel area around the peak. The corresponding background level, which was averaged from the surrounding pixels of each selected spot, was used for fluorescence intensity correction. In each illumination case more than 100 independent detectable imaging spots were used for SB comparison. For all the calibrations, SBRs were defined as: $SBR=I_S/I_B$, where $I_S$ was the sum of the fluorescence intensity of central pixels around the peak, of which the pixel values were corrected by the average background level. $I_B$ was the total background value determined by individual background level of each spot and the average spot size on the camera.

Similar to previous experiments, 20 nm diameter crimson beads (ThermoFisher, 1729879) were mixed with a 12% hydrogel solution. 50 μL of the mixture was injected into a flow chamber, and after 10 min the image was measured by an industrial CMOS camera (DMK 33UX290, The Imaging Source) with 200 mm focal length tube lens.

Regarding characterization of HIST microscopy, for the beam thickness measurement, 200 nm beads (ThermoFisher, 1890851) embedded in 7.5% hydrogel were used. Upon a tile beam illumination with 638 nm or 561 nm laser, fluorescence intensities of each bead at different detection planes (z') were measured by moving a detector with a micrometer. Applicants obtained a corrected depth (z) considering a longitudinal translation of the sample plane and that of the detector plane which are related as $z'/z=(1/n)\times M^2$ where n is a refractive index of the sample and M is a transverse magnification of the system. The intensity at each depth z was averaged from >50 beads and the full width at half maximum (FWHM) of the intensity profile was used for estimating the beam thickness. For effective width measurement, Applicants illuminated a tile beam with a compression ratio of 5× or 8× on a 20 nm bead hydrogel sample and carried out a standard-deviation y-projection. This results in a line profile along the x-axis, and the FWHM of the profile was used as the beam width.

Regarding photobleaching, to compare photobleaching rates of epi and HIST illumination, the probe 1 in a hydrogel was imaged over an 80 μm×80 μm×10 μm imaging volume. The exposure time of each frame was 50 ms and an average laser power measured on the back focal plane was 3.7 mW for both illuminations. The fluorescence intensity of the z-stack was summed and plotted over time. The decay rate of fluorescence intensity was obtained by a single exponential fit to the time trace.

A549 cells (human lung carcinoma, ATCC CCL-185) were cultured with F-12K medium (ATCC, 30-2004) supplemented with 10% fetal bovine serum (F2442, Sigma) and 1% penicillin/streptomycin (ThermoFisher, 15140122). They were plated on an 8-well Lab-Tek chamber and incubated at 37° C. with 5% CO2 for 48-72 hours. Cells were fixed with 4% (v/v) paraformaldehyde (PFA; Electron Microscopy Sciences, 15710) at room temperature for 10 min. After washed three times with 1×PBS, cells were permeabilized by 0.5% (v/v) Triton X-100 in 1× PBS for 15 min. After three times washing with 1× PBS, cells were incubated overnight at 37° C. with a various number of FISH probes (N=32, 24, 16, 12, 8, 4, 2, 1) in a hybridization buffer (100 mg/ml dextran sulfate (Sigma, BCBT0804), 1 mg/ml E. coli tRNA (Roche), 2 mM Vanadyl ribonucleoside complex (New England Biolabs, S1402S), 0.2 mg/ml RNase free bovine serum albumin (Ambion), 2×SSC, 10% deionized formamide. The concentration of each probe used was 2.5 nM. The probes against EEF2 were designed by Stellaris Probe Designer, and 5' amine modified probes were purchased from IDT. All the EEF2 probes were labeled with AlexaFluor647 (AF647, Invitrogen, A10277). The nuclei were stained with DAPI. The z stack images were obtained at 0.25 μm steps with the illumination intensity of 40 W/cm². After maximum projection of the z-stack images, the SBR was calculated as just described. Additionally, we measured the photobleaching steps of four FISH probes with an illumination power of 150 W/cm² at a fixed imaging plane. More than 200 time traces at least were used for constructing the distribution of the photobleaching step.

Wild-type C57BL6 male mice were used in the present study of smFISH on mouse brain tissues. The mice were transcardially perfused with 1× PBS containing heparin (10 units/mL) and fixed with 4% PFA in 0.1M phosphate buffer (pH 7.4). Mouse brains were recovered, post-fixed in 4% PFA solution overnight at 4° C. and kept in 30% sucrose in 1× PBS at 4° C. until sinking. The brain was coronally sectioned with 12 µm thickness using a cryostat, collected in 1× PBS. The brain tissue section was gently transferred to an 8-well Lab-Tek chamber supplemented with 500ł, 1x PBS. The tissue was permeabilized with 200ł, of 0.5% Triton X-100 for 25 min at room temperature. After washed out three times with 1×PBS, the brain tissue was stained with 5 FISH probes overnight in the hybridization buffer at 37° C. The sample was rinsed with wash buffer (10% deionized formamide in 2×SSC), incubated in 2×SSC for an hour at 37° C. and supplemented with imaging buffer before imaging.

While various disclosed embodiments have been described above, it should be understood that they have been presented by way of example only and not as a limitation. Numerous changes to the disclosed embodiments can be made in accordance with the specification herein without departing from the spirit or scope of this specification. Thus the breadth and scope of this specification should not be limited by any of the above-described embodiments; rather, the scope of this specification should be defined in accordance with the appended claims and their equivalents.

We claim:

1. A highly inclined swept tile (HIST) microscope, comprising:
   an optical train having a Cartesian z-direction optical axis, said optical train including a first optical component or assembly disposable to receive a sample object fluorescence excitation input light, wherein said first optical assembly has optical characteristics suitable to transform the input light into a collimated output tile beam in the shape of a line oriented in an x-y-plane and characterized by a length, Ly, along the y-axis, a width, wx, along the x-axis, and a thickness, dz, along the z-axis, further wherein Ly>>wx>>dz;
   a second optical component or assembly disposable to receive the collimated tile-beam and having optical characteristics suitable to orient the tile beam at a highly inclined angle, θ, about the y-axis in the x-z plane;
   a third optical component or assembly having optical characteristics suitable to focus the highly inclined tile beam at an image plane;
   a fourth optical component or assembly disposed in a conjugate back focal plane of the image plane having optical characteristics suitable to sweep the highly inclined tile beam along a horizontal x-axis in the image plane; and
   a detector/camera assembly disposable in a conjugate image plane including either a confocal slit or a functionally equivalent electro-optical confocal slit to receive a fluorescence emission from the sample object, wherein said HIST microscope is to be configured as a confocal, fluorescence emission microscope, further wherein the tile beam thickness, dz, and the tile beam length, Ly, are decoupled, further wherein the HIST microscope has a total imaging area that depends solely on the tile beam width, wx.

2. The HIST microscope of claim 1, wherein the first optical component or assembly is a pair of cylindrical lenses.

3. The HIST microscope of claim 1, wherein the second optical component or assembly is a tiltable mirror.

4. The HIST microscope of claim 1, wherein the third optical component or assembly is an objective.

5. The HIST microscope of claim 1, wherein the fourth optical component or assembly is a galvo mirror.

6. The HIST microscope of claim 1, wherein the detector/camera assembly is a scientific complementary metal-oxide semiconductor (sCMOS) supporting a rolling shutter mode.

7. The HIST microscope of claim 1, wherein 80 µm<Ly<130 µm, 8 µm<wx<14 µm, 3.0 µm<dz<4.0 µm and is characterized by a field of view (FOV) up to 130 µm×130 µm.

8. A method for imaging a sample object, comprising:
   generating a collimated tile beam having a wavelength suitable for generating a fluorescent emission from a region of the sample object, wherein the tile beam has a line shape of length, Ly, thickness, dz, and width, wx, wherein Ly and wx are measured in an x-y Cartesian plane and dz is measured in an orthogonal z-axis beam propagation direction, further wherein Ly>>wx>>dz;
   disposing the tile beam at a highly inclined angle, θ, in the x-z Cartesian plane;
   sweeping the highly inclined tile beam along the x-axis across a region of the sample object and generating a fluorescent emission from the sample object;
   propagating the fluorescent emission from the sample object to a detector comprising a confocal slit, wherein the tile beam is synchronously swept with an output of the detector.

9. The method of claim 8, further comprising generating the collimated tile beam having the length, Ly, between 80-130 µm, the width, wx, between 8-14 µm, and the thickness dz between 3.0-4.0 µm.

10. The method of claim 8, further comprising using two cylindrical lenses to generate the collimated tile beam.

11. The method of claim 8, further comprising using a galvo-mirror to sweep the collimated tile beam.

12. The method of claim 8, further comprising using a moveable mirror conjugated to the imaging plane to incline the collimated tile beam.

13. The method of claim 8, further comprising using a scientific complementary metal-oxide semiconductor (sCMOS) camera supporting a rolling shutter mode to synchronously sweep the collimated tile beam with the readout of the camera.

14. The method of claim 8, further comprising compressing the collimated tile beam by a factor, r, equal to 4×-8× that of a corresponding HILO beam.

15. The method of claim 8, further comprising disposing the tile beam at the highly inclined angle, θ equal to 60-80 degrees.

* * * * *